United States Patent
Morein

(10) Patent No.: US 11,030,960 B2
(45) Date of Patent: Jun. 8, 2021

(54) HOST CONTENT ADAPTIVE BACKLIGHT CONTROL (CABC) AND LOCAL DIMMING

(71) Applicant: Synaptics Incorporated, San Jose, CA (US)

(72) Inventor: Stephen L. Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/119,930

(22) Filed: Aug. 31, 2018

(65) Prior Publication Data

US 2019/0371253 A1 Dec. 5, 2019

Related U.S. Application Data

(60) Provisional application No. 62/677,524, filed on May 29, 2018.

(51) Int. Cl.
*G09G 3/34* (2006.01)
*G06T 9/00* (2006.01)
*G09G 3/20* (2006.01)
*G09G 3/36* (2006.01)
*G09G 5/377* (2006.01)

(52) U.S. Cl.
CPC ............ *G09G 3/3406* (2013.01); *G06T 9/00* (2013.01); *G09G 3/2096* (2013.01); *G09G 3/3607* (2013.01); *G09G 5/377* (2013.01); *G09G 2320/0646* (2013.01); *G09G 2340/02* (2013.01); *G09G 2340/0407* (2013.01); *G09G 2340/0442* (2013.01); *G09G 2340/10* (2013.01); *G09G 2350/00* (2013.01); *G09G 2360/18* (2013.01); *G09G 2370/00* (2013.01)

(58) Field of Classification Search
CPC ....... G09G 3/3406; G09G 3/2096; G06T 9/00
See application file for complete search history.

(56) References Cited

U.S. PATENT DOCUMENTS

| | | | |
|---|---|---|---|
| 2010/0164998 A1 | 7/2010 | Li et al. | |
| 2016/0267715 A1* | 9/2016 | Patel | G06F 3/013 |
| 2017/0256192 A1* | 9/2017 | Knepper | G09G 3/2003 |
| 2017/0263190 A1 | 9/2017 | Yashiki | |
| 2017/0372668 A1 | 12/2017 | Yashiki | |
| 2018/0005357 A1* | 1/2018 | Lasserre | G06T 5/009 |

OTHER PUBLICATIONS

International Search Report and Written Opinion for PCT Application No. PCT/US2019/027547, dated Aug. 2, 2019, 11 pages.

* cited by examiner

*Primary Examiner* — Kent W Chang
*Assistant Examiner* — Chayce R Bibbee
(74) *Attorney, Agent, or Firm* — Paradice & Li LLP

(57) ABSTRACT

A method and apparatus for content adaptive backlight control (CABC) is disclosed. A display device comprises a display surface including a plurality of pixel elements and a backlight configured to illuminate the display surface. A display driver of the display device is configured to receive a frame of display data, including pixel data for displaying an image on the display surface and backlight configuration data for adjusting the backlight when displaying the image. The display driver is further configured to update the plurality of pixel elements using the pixel data, and update an intensity of the backlight using the backlight configuration data. More specifically, the updates to the backlight and the display surface are performed concurrently for the received frame of display data.

15 Claims, 11 Drawing Sheets

HOST CONTENT ADAPTIVE BACKLIGHT CONTROL (CABC) AND LOCAL DIMMING

CROSS-REFERENCE TO RELATED APPLICATION

This application claims priority and benefit under 35 USC § 119(e) to U.S. Provisional Patent Application No. 62/677,524, filed on May 29, 2018, which is incorporated herein by reference in its entirety.

TECHNICAL FIELD

The present embodiments relate generally to display technologies, and specifically to content adaptive backlight control (CABC) and local dimming for display devices.

BACKGROUND OF RELATED ART

Head-mounted display (HMD) devices are configured to be worn on, or otherwise affixed to, a user's head. An HMD device may comprise one or more displays positioned in front of one, or both, of the user's eyes. The HMD may display images (e.g., still images, sequences of images, and/or videos) from an image source overlaid with information and/or images from the user's surrounding environment (e.g., as captured by a camera), for example, to immerse the user in a virtual world. HMD devices have applications in medical, military, gaming, aviation, engineering, and various other professional and/or entertainment industries.

HMD devices may use liquid-crystal display (LCD) technologies in their displays. Since they do not emit light, LCDs rely on a separate light source that projects light onto the front and/or from behind the display. Some HMD devices use backlit LCDs. A backlit LCD assembly includes a light source positioned behind the surface of the display screen (e.g., a backlight) that projects light onto the LCD layer to illuminate the pixels for display. Example light sources may include cold cathode fluorescent lamps (CCFLs), external electrode fluorescent lamps (EEFLs), hot-cathode fluorescent lamps (HCFLs), flat fluorescent lamps (FFLs), light-emitting diodes (LEDs), or any combination thereof.

Content adaptive backlight control (CABC) is a technique for controlling the amount of light emitted by the backlight of the LCD assembly, for example, to enhance image quality and/or conserve power. For example, the LCD assembly may include an inverter that controls the brightness of the backlight via a dimming signal. The dimming signal may be a pulse-width modulated (PWM) waveform, and the inverter may repeatedly turn the backlight on and off based on the duty ratio of the dimming signal. The amount of dimming may depend on the brightness (e.g., pixel intensities) of the image being displayed. For example, a darker image may be accurately reproduced using a relatively dim backlight. However, brighter images may be "clipped" when the amount of illumination from the backlight is inadequate, resulting in images that appear washed out.

Conventional CABC techniques are implemented by the display driver of an LCD assembly (e.g., provided on the HMD device). For example, the display driver may analyze the image to be displayed on the LCD, and may determine an intensity of the backlight to be used when displaying the corresponding image. Because the backlight intensity is calculated at the time of display, the dimming signal provided to the backlight lags the pixel updates provided to the LCD by at least one frame. In other words, the backlight dimming being implemented for a current frame may be calculated based on image data from a previous frame. This lag may result in artifacts that are much more noticeable to a user of an HMD device than other LCD applications (e.g., televisions, computer monitors, mobile device screens, etc.).

SUMMARY

This Summary is provided to introduce in a simplified form a selection of concepts that are further described below in the Detailed Description. This Summary is not intended to identify key features or essential features of the claims subject matter, nor is it intended to limit the scope of the claimed subject matter.

One innovative aspect of the subject matter of this disclosure can be implemented in a display device comprising a display surface including a plurality of pixel elements and a backlight configured to illuminate the display surface. A display driver of the display device is configured to receive a frame of display data, including pixel data for displaying an image on the display surface and backlight configuration data for adjusting the backlight when displaying the image. The display driver is further configured to update the plurality of pixel elements using the pixel data, and update an intensity of the backlight using the backlight configuration data. More specifically, the updates to the backlight and the display surface are performed concurrently for the received frame of display data.

In some embodiments, the backlight configuration data may be encoded as a portion of the pixel data. In some aspects, the portion of pixel data may correspond to a non-display region of the image. Still further, in some aspects, the backlight configuration data may be encoded in accordance with a 2-bits per pixel sparse encoding technique wherein each pattern of bits is represented by a different pixel color.

The frame of display data may correspond to a frame buffer image comprising a full field-of-view (FFOV) image and a foveal image. In some embodiments, the display device may identify the portion of pixel data corresponding to the backlight configuration data based at least in part on an aspect ratio of the frame buffer image. In some aspects, the display device may determine a position of the FFOV image in relation to the foveal image based on the aspect ratio of the frame buffer image and identify the portion of pixel data corresponding to the backlight configuration data based on the position of the FFOV image.

In some embodiments, the backlight configuration data may be encoded in a corner of the FFOV image. In some aspects, the foveal image may be merged with the FFOV image when the aspect ratio of the frame buffer image matches an aspect ratio of the display surface. In some other aspects, the foveal image may be separate from the FFOV image when the aspect ratio of the frame buffer image is different than an aspect ratio of the display surface.

Another innovative aspect of the subject matter of this disclosure can be implemented in a system comprising a host device and a display device. The host device is configured to receive image data from an image source. In some embodiments, the host device may render pixel data for displaying an image based on the received image data. The host device may also render backlight configuration data for adjusting a brightness of the image based on the received image data. The host device may generate a frame buffer image that includes the pixel data and the backlight configuration data, and transmit the frame buffer image over a communication link. The display device includes a display surface and a backlight. In some embodiments, the display device may be configured to receive the frame buffer image via the communication link. The display device may further update a plurality of pixel elements of the display surface using the pixel data in the received frame buffer image and update an intensity of the backlight using the backlight configuration data in the received frame buffer image.

In some embodiments, the host device may generate the frame buffer image by encoding the backlight configuration data as a portion of the pixel data in a non-display region of the frame buffer image.

In some aspects, the backlight may comprise an array of discrete light sources. Thus, in some embodiments, the host device may render the backlight configuration data by generating a backlight image indicating a respective intensity of each of the discrete light sources. The host device may further compress the backlight image using a compression technique and decompress the backlight image using a decompression technique. The backlight configuration data may correspond to the decompressed backlight image.

In some embodiments, the host device may transmit the frame buffer image by compressing the frame buffer image using the compression technique and transmitting the compressed frame buffer image over the communication link. In some embodiments, the display device may receive the frame buffer image by receiving the compressed frame buffer image via the communication link and decompressing the received frame buffer image using the decompression technique.

BRIEF DESCRIPTION OF THE DRAWINGS

The present embodiments are illustrated by way of example and are not intended to be limited by the figures of the accompanying drawings.

DETAILED DESCRIPTION

Figure 1:
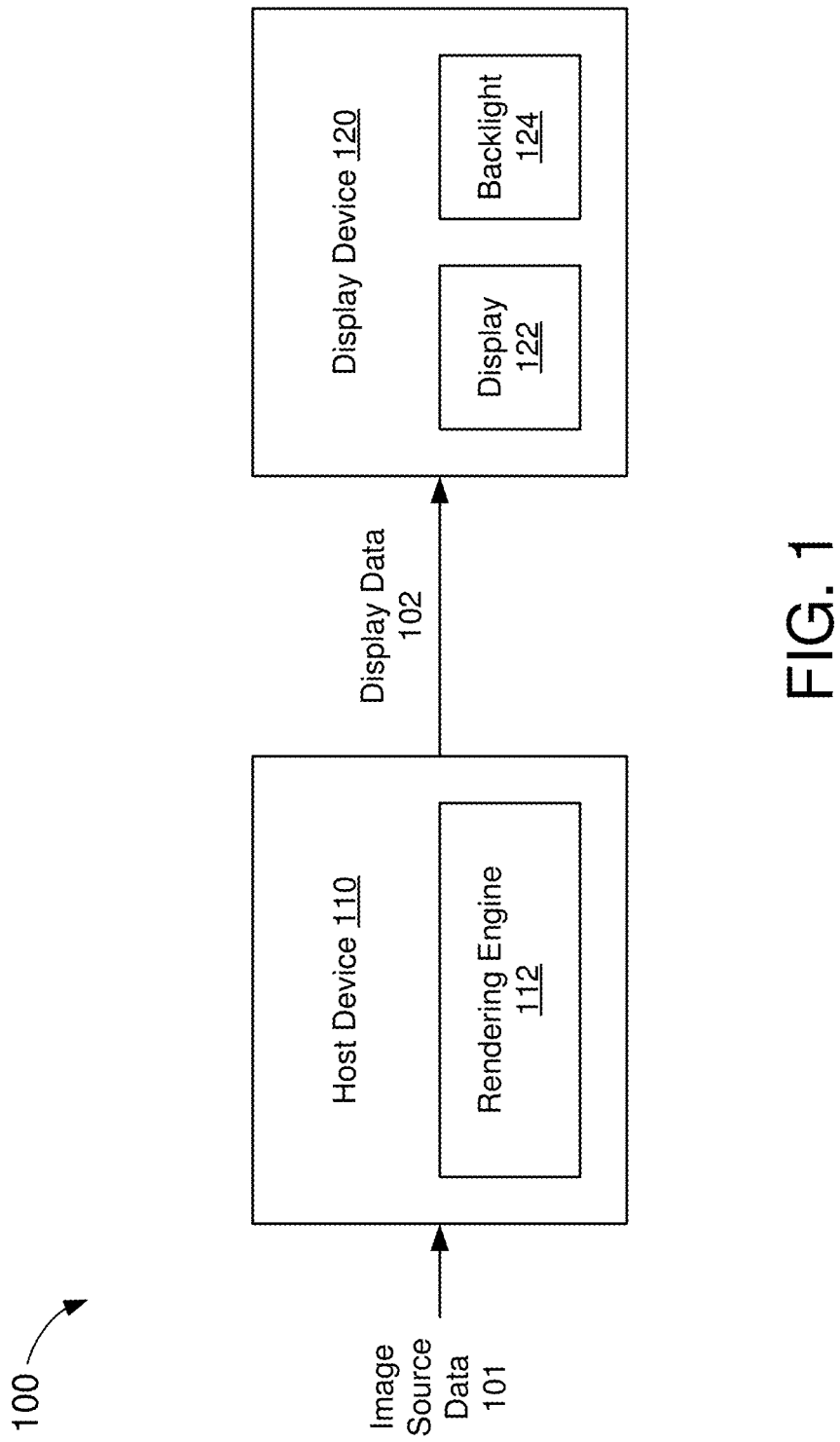
FIG. 1 shows an example display system within which the present embodiments may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general purpose processor, conventional processor, controller, microcontroller, and/or state machine capable of executing scripts or instructions of one or more software programs stored in memory. The term "voltage source," as used herein may refer to a direct-current (DC) voltage source, an alternating-current (AC) voltage source, or any other means of creating an electrical potential (such as ground).

FIG. 1 shows an example display system 100 within which the present embodiments may be implemented. The display system 100 includes a host device 110 and a display device 120. The display device 120 may be any device configured to display an image, or sequence of images (e.g., video), to a user. In some embodiments, the display device 120 may be a head-mounted display (HMD) device. In some aspects, the host device 110 may be implemented as a physical part of the display device 120. Alternatively, the host device 110 may be coupled to (and communicate with) components of the display device 120 using various wired and/or wireless interconnection and communication technologies, such as buses and networks. Example technologies may include Inter-Integrated Circuit (I²C), Serial Peripheral Interface (SPI), PS/2, Universal Serial bus (USB), Bluetooth®, Infrared Data Association (IrDA), and various radio frequency (RF) communication protocols defined by the IEEE 802.11 standard. In the example of FIG. 1, the host device 110 and HMD device 120 are shown as separate pieces of equipment. However, in actual implementations, the host device 110 and the HMD device 120 may be separate components within the same physical device frame.

The host device 110 receives image source data 101 from an image source (not shown for simplicity) and renders the image source data 101 for display (e.g., as display data 102) on the display device 120. In some embodiments, the host device 110 may include a rendering engine 112 configured to process the image source data 101 according to one or more capabilities of the display device 120. For example, in some aspects, the display device 120 may display a dynamically-updated image to a user based on the user's eye position. More specifically, the display device 120 may track the user's eye movements and may display a portion of the image coinciding with a fixation point of the user (e.g., foveal region) with higher resolution than other regions of the image (e.g., the full-frame image). Thus, in some embodiments, the rendering engine 112 may generate a high-resolution foveal image to be overlaid in the foveal region of the full-frame image. In some other embodiments, the rendering engine 112 may scale the full-frame image for display (e.g., at a lower-resolution than the foveal image) on the display device 120.

The display device 120 receives the display data 102 from the host device 110 and displays a corresponding image to the user based on the received display data 102. In some embodiments, the display device 120 may include a display 122 and a backlight 124. The display 122 may be any type of dynamic display capable of displaying an image, or sequence of images, to the user. Examples of suitable display screen technologies may include, but are not limited to, light emitting diode (LED), organic LED (OLED), cathode ray tube (CRT), liquid crystal display (LCD), plasma, and electroluminescence (EL).

In some embodiments, the display 122 may be a liquid-crystal display (LCD) panel formed from an array of pixel elements (e.g., liquid crystal cells) configured to allow varying amounts of light to pass from one surface of the display panel to another (e.g., depending on a voltage or electric field applied to each pixel element). For example, the display device 120 may apply an appropriate voltage to each of the pixel elements to render a combined image, which includes the foveal image overlaid upon the full-frame image, on the display 122. As described above, LCDs do not emit light and therefore rely on a separate light source to illuminate the pixel elements so that the image is viewable by the user.

The backlight 124 may be positioned adjacent the display 122 to illuminate the pixel elements from behind. The backlight 124 may comprise one or more light sources including, but not limited to, cold cathode fluorescent lamps (CCFLs), external electrode fluorescent lamps (EEFLs), hot-cathode fluorescent lamps (HCFLs), flat fluorescent lamps (FFLs), light-emitting diodes (LEDs), or any combination thereof. In some aspects, the backlight 124 may include an array of discrete light sources (such as LEDs) that can provide different levels of illumination to different regions of the display 122. In some embodiments, the display device 120 may include an inverter (not shown for simplicity) that can dynamically alter the intensity or brightness of the backlight 124, for example, to enhance image quality and/or conserve power.

As described above, the intensity of the backlight 124 may affect the quality of the image or video presented on the display 122. For example, dimming the backlight 124 beyond a certain threshold may cause one or more pixels of the display 122 to become clipped, resulting in washout. On the other hand, varying the intensity of the backlight 124 by significant amounts, from frame to frame, may create a flickering effect that can be highly distracting to the user. Thus, in some embodiments, the display system 100 may include a backlight controller (not shown for simplicity) that can dynamically configure the intensity of the backlight 124 to reduce the occurrence of such artifacts and/or prevent them from interfering with the user's viewing experience.

Figure 2:
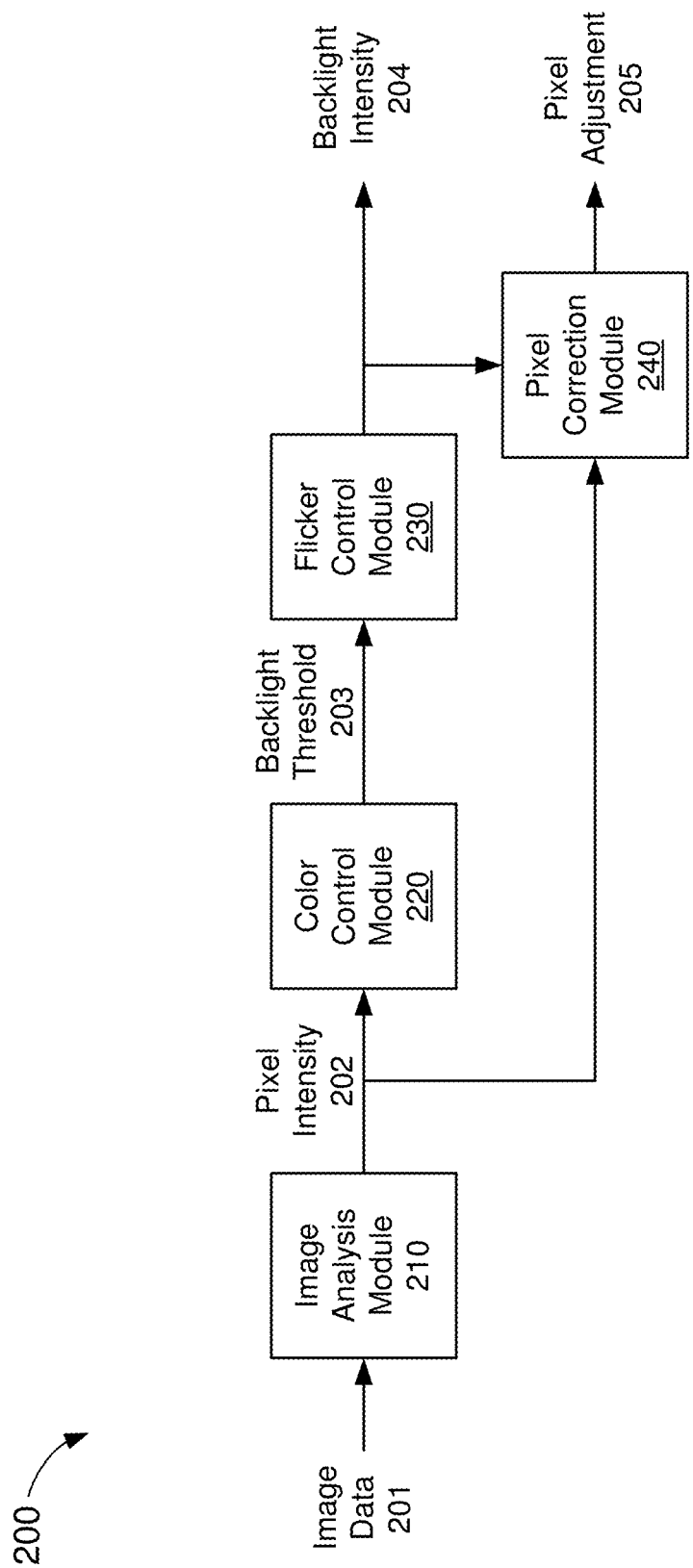
FIG. 2 shows a block diagram of an example backlight controller, in accordance with some embodiments.

FIG. 2 shows a block diagram of an example backlight controller 200, in accordance with some embodiments. In some embodiments, the backlight controller 200 may be included in, or implemented by, the display system 100 of FIG. 1 to determine a desired (e.g., optimal) backlight intensity when displaying a particular image or frame. More specifically, the backlight controller 200 may determine the intensity or amount of illumination of the backlight 124 based, at least in part, on pixel information associated with an image or frame to be rendered on the display 122. The backlight controller 200 may include an image analysis module 210, a color control module 220, a flicker control module 230, and a pixel correction module 240.

The image analysis module 210 may receive image data 201 associated with an image to be displayed by a corresponding display device (e.g., display 122), and may determine pixel intensity information 202 for the image based on the received image data 201. As described above, the display 122 may be an LCD display panel comprising an array of pixel elements (e.g., liquid crystal cells). Each pixel element may further comprise a plurality of subpixels including, but not limited to, red (R), green (G), and blue (B) subpixels. The image data 201 may include R, G, and B values for the subpixels of the image to be displayed. More specifically, the R, G, and B values may indicate a level of brightness (or gray level) for each pixel. Thus, in some aspects, the image analysis module 210 may generate the pixel intensity information 202, indicating the brightness (or gray) level of each pixel, based on a weighted sum (or average) of the R, G, and B values from the received image data 201.

The color control module 220 may receive the pixel intensity information 202 from the image analysis module 210, and may determine a threshold backlight intensity 203 based on the pixel intensity information 202. In some embodiments, the color control module 220 may perform a histogram-based analysis of the brightness level of each pixel (e.g., as derived from the pixel intensity information 202) to determine the threshold backlight intensity 203. For example, a histogram may represent a pixel brightness distribution of the image to be displayed. More specifically, the histogram may indicate the frequency of (e.g., number of pixels associated with) each brightness level in the image. The color control module 220 may analyze the pixel brightness distribution of the image to determine an overall brightness measure of the image to be displayed. The color control module 220 may then determine the threshold backlight intensity 203 based on the brightness measure of the image. For example, the threshold backlight intensity 203 may correspond to the lowest backlight intensity that can achieve or maintain the brightness measure of the image.

As described above, dimming the backlight beyond a certain threshold may cause one or more pixels of the display to become clipped, resulting in washout. In other words, the intensity of the backlight becomes the limiting factor (for the pixel intensity) when the brightness of the pixel cannot be further increased by applying a higher (or lower) voltage to the liquid crystal cell. Thus, in some aspects, the color control module 220 may prevent washout by setting the brightness measure of the image according to the brightest pixel intensity observed in the pixel brightness distribution. For example, if the brightest pixel in the image is at 80% of a maximum brightness level, the overall brightness measure of the image may be characterized as 80%. Accordingly, the threshold backlight intensity 203 may be set at 80% of the maximum achievable brightness of the backlight.

It is noted, however, that some degree of washout may be virtually unnoticeable to the human eye. Thus, in some aspects, the color control module 220 may allow some of the pixels to be clipped in order to further reduce the intensity of the backlight. For example, the color control module 220 may calculate the overall brightness measure of the image based on an average brightness (or weighted average) of each of the pixels in the image. For example, if the pixel brightness distribution suggests that the average pixel brightness is at 60% of a maximum brightness level, the overall brightness measure of the image may be characterized as 60%. Accordingly, the threshold backlight intensity 203 may be set at 60% of the maximum achievable brightness of the backlight.

The flicker control module 230 may receive the threshold backlight intensity information 203 from the color control module 220, and may determine a final backlight intensity 204 to be associated with the current image or frame. In some embodiments, the flicker control module 230 may perform a historical analysis of the backlight intensities associated with one or more previous images or frames in the sequence to determine the backlight intensity 204 for the current image or frame. As described above, varying the backlight intensity by significant amounts, from frame to frame, may create a flickering effect that can be highly distracting to the user. Thus, in some embodiments, the flicker control module 230 may "smooth out" any changes in backlight intensity to reduce flicker in the displayed image.

In some aspects, the flicker control module 230 may ensure that changes in backlight intensity occur gradually. For example, the flicker control module 230 may calculate the backlight intensity 204 for the current frame based on an average (or weighted average) of the threshold backlight intensity 203 and the backlight intensities associated with one or more previous frames. Thus, if the backlight intensity associated with a preceding frame was set at 100% of the maximum brightness of the backlight, and the threshold backlight intensity 203 for the current frame is set at 60%, the flicker control module 230 may set the final backlight intensity 204 for the current frame at 80% of the maximum brightness of the backlight.

In some other aspects, the flicker control module 230 may ensure that the backlight intensity does not change by more than a threshold amount. For example, if the threshold backlight intensity 203 deviates from the backlight intensities of one or more previous frames by more than a threshold amount (e.g., ±10%), the flicker control module 230 may cap the change in backlight intensity by the threshold amount. Thus, if the backlight intensity associated with a preceding frame was set at 100% of the maximum brightness of the backlight, and the threshold backlight intensity 203 for the current frame is set at 60%, the flicker control module 230 may set the final backlight intensity 204 for the current frame at 90% (e.g., assuming the threshold change in backlight intensity is capped at ±10%).

The pixel correction module 240 may receive the backlight intensity information 204 from the flicker control module 230 and the pixel intensity information 202 from the image analysis module 210, and may determine one or more pixel adjustment values 205 associated with the current image or frame. In some embodiments, the pixel adjustment values 205 may be used to adjust the voltages controlling the pixel elements of the display in proportion to the amount of dimming applied to the backlight. As described above, the voltage applied to a pixel element determines the amount of light (e.g., from the backlight) allowed through to the surface of the display by that particular pixel element. Reducing the intensity of the backlight naturally results in reduced pixel brightness. To compensate for the reduced brightness of the backlight, it may be desirable to increase (or decrease) the voltage of one or more of the pixels to allow a greater amount of light to pass through.

Thus, depending on the desired brightness of a particular pixel (e.g., as derived from the from the pixel intensity information 202), the pixel correction module 240 may selectively adjust the voltage that would otherwise be applied to that particular pixel, for example, to compensate for the brightness of the backlight associated with the image to be displayed (e.g., as derived from the backlight intensity information 204). For example, if the backlight intensity 204 is reduced by 10% (relative to its maximum brightness), the pixel correction module 240 may determine that the voltage applied to one or more pixel elements should be increased proportionately (e.g., to allow 10% more light through).

The backlight intensity information 204 and pixel adjustment values 205 collectively correspond to a backlight configuration that may be used to control the pixel elements of a display and a backlight associated with the display. For example, the backlight intensity information 204 may be provided to an inverter on the display device 120 to dynamically dim the backlight 124 (e.g., using PWM control signals). Similarly, the pixel adjustment values 205 may be provided to a gate-line driver and/or source-line driver on the display device 120 to drive the adjusted voltages onto the corresponding pixel elements (e.g., via respective gate lines and source lines).

In conventional display systems, the backlight controller 200 is provided on (or implemented by) a display driver residing on the display device (e.g., display device 120). Thus, the display driver may generate the backlight configuration (e.g., including the backlight intensity information 204 and pixel adjustment values 205) while concurrently rendering each frame of display data received from the host. However, because the backlight configuration is determined based on a frame that is already being displayed, the backlight intensity information 204 and pixel adjustment values 205 may lag the control information provided to the pixel array by at least one frame. In other words, the backlight intensity information 204 and pixel adjustment values 205 generated from a particular frame are actually implemented when displaying the next frame in the sequence. This lag may result in artifacts that are much more noticeable to a user of an HMD device than other display applications (e.g., televisions, computer monitors, mobile device screens, etc.).

In some embodiments, the backlight controller 200 may be provided on (or implemented by) the host device 110. For example, the host device 110 may generate the backlight intensity information 204 and pixel adjustment values 205 concurrently while processing the image source data 101 for display on the display device 120. Accordingly, the host device 110 may send the backlight intensity information 204 and pixel adjustment values 205, together with the display data 102, to the display device 120. In some embodiments, the host device 110 may record the backlight intensity information 204 and pixel adjustment values 205 in the display data 102 (e.g., as described in greater detail below). Thus, upon receiving the display data 102 from the host device 110, the display device 120 may render the corresponding image on the display 122 using the correct pixel adjustment values 205, and backlight intensity information 204 for controlling the backlight 124, for that particular frame.

Figure 3:
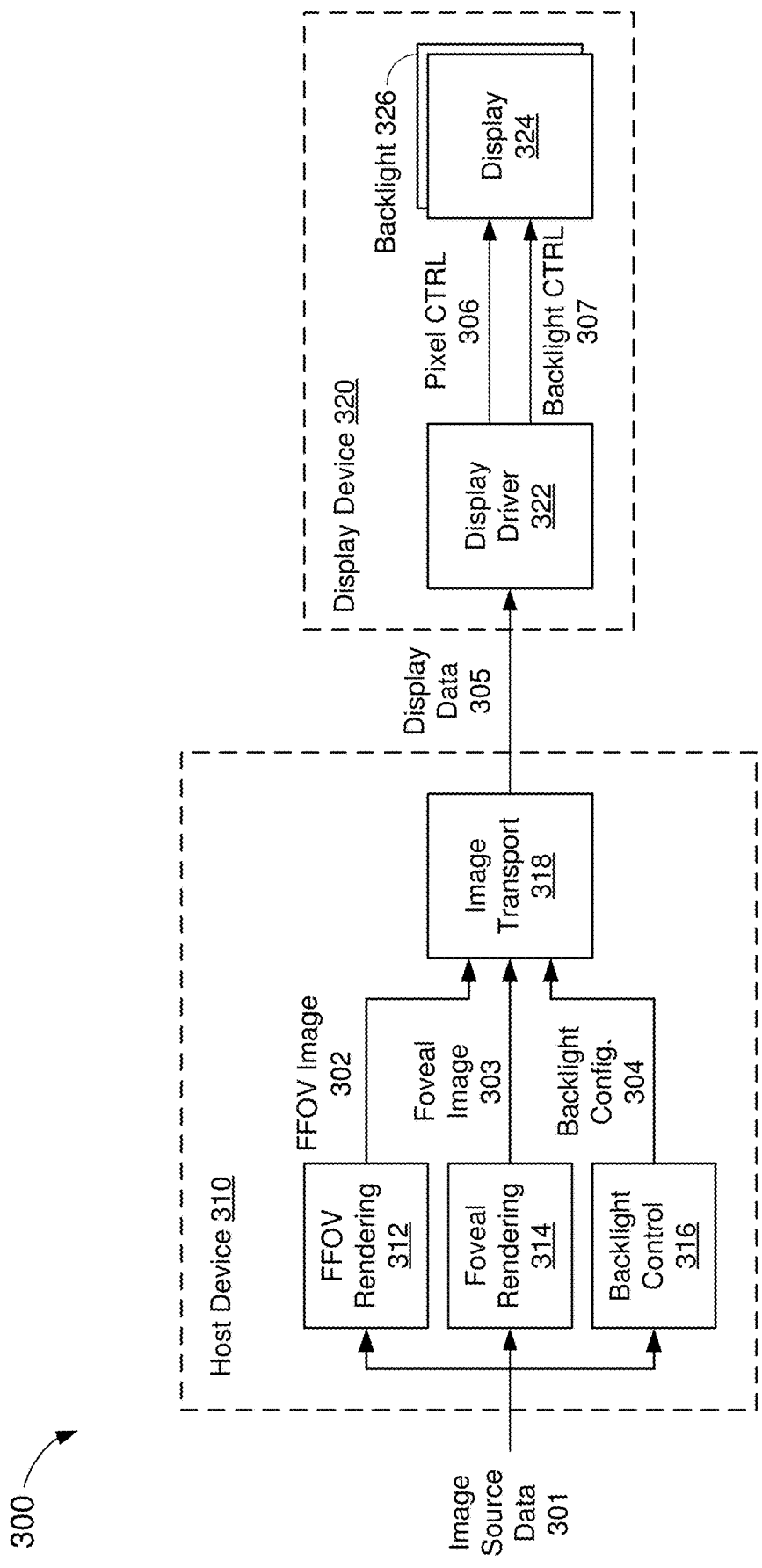
FIG. 3 shows an example display system including a host device that provides backlight control for a display device, in accordance with some embodiments.

FIG. 3 shows an example display system 300 including a host device 310 that provides backlight control for a display device 320, in accordance with some embodiments. The display system 300 may be an example embodiment of the display system 100 of FIG. 1. Thus, the display device 320 may be any device configured to display an image, or sequence of images (e.g., video), to a user. In some embodiments, the display device 320 may be a head-mounted display (HMD) device. Further, in some aspects, the host device 310 may be implemented as a physical part of the display device 320. Alternatively, the host device 310 may be coupled to (and communicate with) components of the display device 320 using various wired and/or wireless interconnection and communication technologies, such as buses and networks.

Figure 4:
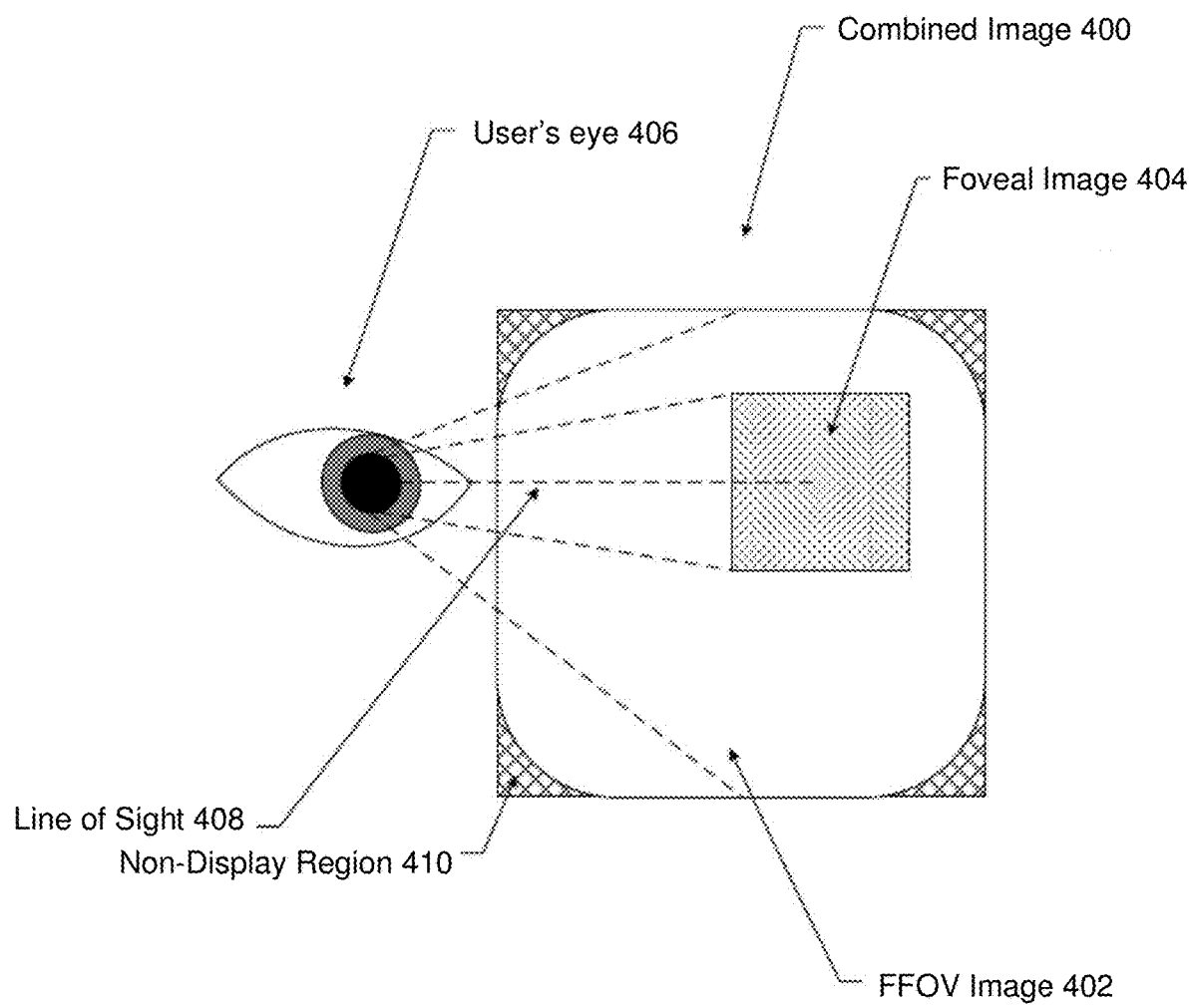
FIG. 4 shows an example image that may be displayed on a display device, in accordance with some embodiments.

The host device 310 receives image source data 301 from an image source (not shown for simplicity) and renders the image source data 301 for display (e.g., as display data 305) on the display device 320. In some embodiments, the host device 310 may dynamically render the image source data 301 based on a user's eye position and/or movements while operating the display device 320. For example, the host device 310 may render a portion of the image coinciding with a fixation point of the user (e.g., foveal region) with higher resolution than other regions of the image (e.g., the full-frame image). The overall resolution of the image may depend on prior rendering, storage requirements, and/or the resolution of the display in the display device 320. For example, FIG. 4 shows a combined image 400 that can be displayed on the display device 320. The combined image 400 is shown to include a foveal image 404 merged with a full field-of-view (FFOV) image 402. In some aspects, the combined image 400 may be displayed to both of the user's eyes (e.g., on a single display panel or surface of the display device 320). In other aspects, variations of the combined image 400 may be displayed to different eyes (e.g., using multiple display panels or surfaces of the display device 320).

The FFOV image 402 spans the periphery of the user's line of sight 408. Thus, the FFOV image 402 may correspond with the full-frame image to be displayed across most (if not all) of the display region of the display device 320. For example, in a virtual reality environment, the FFOV image 402 may show the extent of the observable virtual or real world that is seen by the user's eyes at any given moment. In contrast, the foveal image 404 spans only the foveal region of the user's line of sight 408. The foveal region may correspond to the portion of the combined image 400 that is viewable by the fovea centralis portion of the user's eye 406 (e.g., the region in which the user is determined to have maximal visual acuity at any given moment). In some embodiments, the foveal image 404 may span a region larger than the actual foveal region of the user's line of sight 408 to compensate for errors and/or delays in eye tracking.

As shown in FIG. 4, the foveal image 404 may encompass a relatively small portion of the combined image 400 compared to the FFOV image 402. More specifically, when generating the combined image 400, the foveal image 404 may be overlaid upon a portion of the FFOV image 402 (e.g., coinciding with the foveal region of the user's line of sight 408). Because the foveal image 404 spans a region in which the user has maximal visual acuity, the foveal image 404 may be rendered at a higher resolution than the FFOV image 402. Accordingly, the foveal image 404 may appear sharper than the FFOV image 402 in the combined image 400. In some embodiments, the foveal image 404 may have a uniform resolution throughout. In other embodiments, the foveal image 404 may have a resolution that is scaled at the edges. For example, the central portion of the foveal image 404 may be rendered at a higher resolution than the outer portions (e.g., edges) of the foveal image 404. Furthermore, the edges and/or border regions of the foveal image 404 may be blended into the FFOV image 402 when generating the combined image 400. For example, the blending may create a smoother or more natural boundary between the foveal image 404 and the FFOV image 402.

Referring back to FIG. 3, the host device 310 may include a full field-of-view (FFOV) rendering engine 312, a foveal rendering engine 314, a backlight controller 316, and an image transport module 318. The FFOV rendering engine 312 is configured to generate an FFOV image 302 (such as the FFOV image 402 of FIG. 4) based on the image source data 301. For example, the FFOV image 302 may correspond with a full-frame image to be displayed across most (if not all) of the display region of the display device 320. Since the FFOV image 302 may span the periphery of the user's line of sight, the FFOV rendering engine 312 may render the FFOV image 302 at a relatively low resolution (e.g., half the maximum resolution of the image source data 301 and/or display device 320) to conserve bandwidth.

The foveal rendering engine 314 is configured to generate a foveal image 303 (such as the foveal image 404 of FIG. 4) based on the image source data 301. For example, the foveal image 303 may span only the foveal region of the user's line of sight. Since the foveal region may correspond to the region in which the user is determined to have maximal visual acuity, the foveal rendering engine 314 may render the foveal image 303 at a relatively high resolution (e.g., the maximum resolution of the image source data 301 and/or display device 320). In some embodiments, the foveal image 303 may be configured to span a region larger than the actual foveal region of the user's line of sight to compensate for errors and/or delays in eye tracking. In some embodiments, the foveal image 303 may have a uniform resolution throughout. In other embodiments, the foveal image 303 may have a resolution that is scaled at the edges.

The backlight controller 316 is configured to generate a backlight configuration 304 based on the image source data 301. In some embodiments, the backlight controller 200 of FIG. 2 may be an example implementation of the backlight controller 316. Thus, the backlight controller 316 may determine a backlight intensity to be used when displaying the image associated with the image source data 301. For example, the backlight controller 316 may determine an amount of dimming to be applied to the backlight of the display device 320 (such as the backlight intensity information 204) and a voltage adjustment to be applied to the pixel elements of the display of the display device 320 (such as the pixel adjustment values 205) when a corresponding image (e.g., based on the image source data 301) is displayed on the display device 320. Thus, in some aspects, the backlight configuration 304 may include the backlight intensity information 204 and/or the pixel adjustment values 205.

The image transport module 318 is configured to combine the outputs of the FFOV rendering engine 312, the foveal rendering engine 314, and the backlight controller 316 into a single frame of display data 305 to be transmitted to the display device 320. For example, the image transport module 318 may encode and/or compress the FFOV image 302, the foveal image 303, and the backlight configuration 304 for transmission over a wired or wireless communication medium. More specifically, the image transport module 318 may transmit the backlight configuration 304 together with the FFOV image 302 and the foveal image 303 over the same channel (e.g., as display data 305). In some embodiments, the image transport module 318 may encode the backlight configuration 304 as pixel data stored on the FFOV image 302. This may reduce the bandwidth and/or frequency of communications between the host device 310 and display device 320 and ensure that the backlight configuration 304 is received, and thus processed, by the display device 320 concurrently with the associated image data (e.g., corresponding to the FFOV image 302 and foveal image 303).

With reference for example to FIG. 4, the FFOV image 402 (and combined image 400) may include a number of non-display regions 410. In some aspects, the non-display regions 410 may correspond to unused pixels in the FFOV image 402 devoid of pixel data. For example, the non-display regions 410 may be devoid of pixel data a result of the optical limitations of a camera lens used to capture the FFOV image 402. In some other aspects, the non-display regions 410 may correspond to portions of the FFOV image 402 that cannot be viewed by the user. For example, the non-display regions 410 may coincide with a curvature of the display and/or regions of the FFOV image 402 that are beyond the periphery of the user's line of sight 408. Aspects of the present disclosure recognize that, because the non-display regions 410 are not displayable by the display device 320 and/or viewable by the user, additional pixel data may be encoded therein without interfering with the user's viewing experience. Thus, in some embodiments, the image transport module 318 may encode the backlight configuration 304 in one or more non-display regions of the FFOV image 302.

Figure 5:
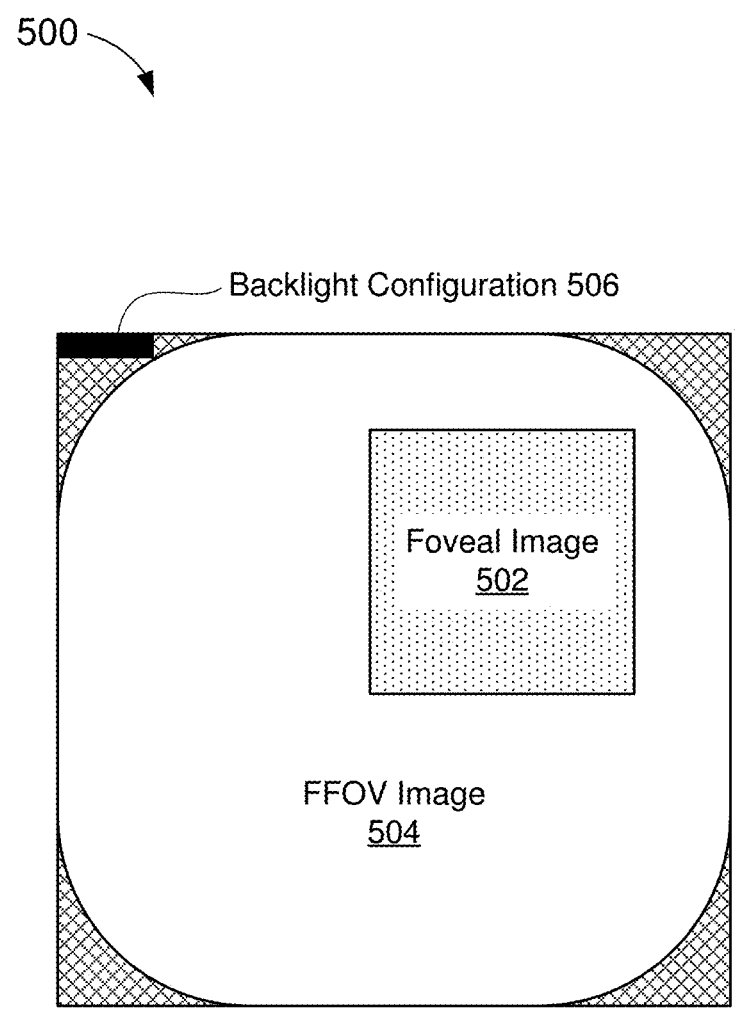
FIG. 5 shows an example frame buffer image with an embedded backlight configuration, in accordance with some embodiments.

In some embodiments, the image transport module 318 may merge the FFOV image 302 and the foveal image 303 into a combined image (such as the combined image 400 of FIG. 4), and transmit the combined image as a single frame to the display device 320 for display. For example, FIG. 5 shows an example frame buffer image 500 that may be generated by the image transport module 318 when merging the FFOV image 302 with the foveal image 303. When generating the frame buffer image 500, the image transport module 318 may first upscale the FFOV image 302 to the resolution at which it is to be displayed (e.g., FFOV image 504). The image transport module 318 may then merge the foveal image 303 with the FFOV image 302 as an overlay (e.g., foveal image 502). In some embodiments, the image transport module 318 may further encode the backlight configuration 304 in a portion of the frame buffer image 500 coinciding with a non-display region of the FFOV image 504. In the example of FIG. 5, a backlight configuration 506 is encoded in the upper-left corner of the frame buffer image 500.

In some embodiments, the backlight configuration 506 may be encoded as pixel data. For example, the backlight configuration 506 may be encoded using the first 32 pixels of the first 2 lines of the frame buffer image 500. In some implementations, the image transport module 318 may encode the backlight configuration 506 using a 2-bits per pixel sparse encoding technique. For example, bits "00" may be encoded as a black pixel, bits "01" may be encoded as a red pixel, bits "10" may be encoded as a green pixel, and bits "11" may be encoded as a white pixel. The sparse encoding may provide greater robustness against compression and/or other processing along the data path, and may thus allow the backlight configuration 506 to survive display stream compression (DSC) and/or other compression algorithms or techniques. In some implementations, the backlight configuration 506 may specify the length or duration of a backlight burst (e.g., 12 bits) and/or the PWM current for controlling the backlight burst (e.g., 12 bits). For example, the length or PWM values can be adjusted to set the brightness or intensity of the backlight.

Figure 6:
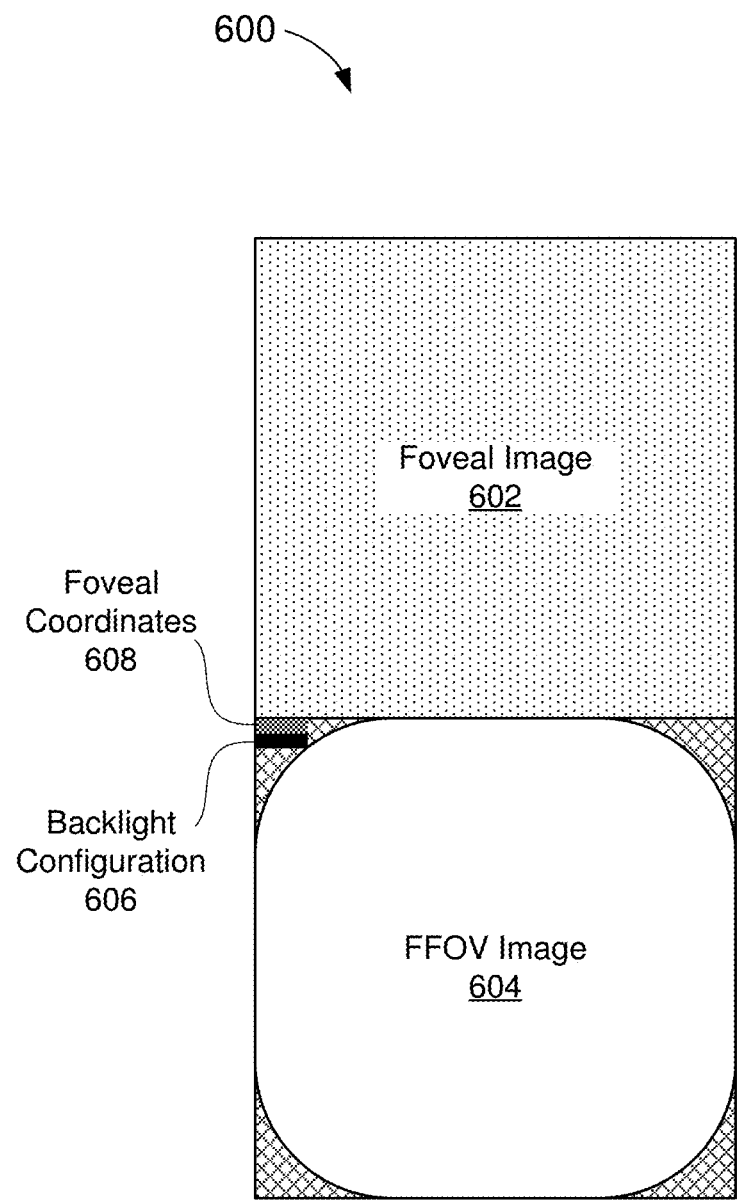
FIG. 6 shows an example frame buffer image with embedded foveal coordinates and backlight configuration, in accordance with some embodiments.

In some other embodiments, the image transport module 318 may transmit the FFOV image 302 and the foveal image 303 separately, but in the same frame (e.g., the FFOV image 302 and foveal image 303 are sent sequentially as part of the same frame buffer image). For example, FIG. 6 shows an example frame buffer image 600 that may be generated by the image transmit module 318 when transmitting the FFOV image 302 separately from the foveal image 303. When generating the frame buffer image 600, the image transport module 318 may not upscale the FFOV image 302 to the resolution at which it is to be displayed (e.g., FFOV image 604). Rather, the FFOV image 302 and the foveal image 303 are each transmitted in their "native" resolutions. As a result, the bandwidth needed to transmit the frame buffer image 600 may be substantially less than the bandwidth needed to transmit the frame buffer image 500 of FIG. 5. In the example of FIG. 6, the foveal image 303 may be encoded in a first portion of the frame buffer image 600 (e.g., foveal image 602) and the FFOV image 302 may be encoded in a second portion of the frame buffer image 600 (e.g., FFOV image 604). Accordingly, the foveal image 602 and FFOV image 604 may be transmitted sequentially (e.g., in the order of encoding) by the image transport module 318.

In some embodiments, the image transport module 318 may further encode a set of foveal coordinates 608, in the frame buffer image 600, specifying the foveal region of the FFOV image 604. For example, the foveal coordinates 608 may indicate to the display device 320 where to overlay the foveal image 602 with respect to the FFOV image 604 when rendering a combined image on a display (such as the combined image 400 of FIG. 4). In some embodiments, the image transport module 318 may encode the foveal coordinates 608 in a portion of the frame buffer image 600 coinciding with a non-display region of the FFOV image 604. The image transport module 318 may further encode the backlight configuration 304 in the same (or different) portion of the frame buffer image 600. In the example of FIG. 6, the foveal coordinates 608 and backlight configuration 606 are encoded in the upper-left corner of the frame buffer image 600.

In some embodiments, the foveal coordinates 608 and/or backlight configuration 606 may be encoded as pixel data. For example, the foveal coordinates 608 and/or backlight configuration 606 may be encoded using the first 32 pixels of the first 2 lines of the frame buffer image 600. In the example of FIG. 6, the foveal coordinates 608 are encoded on the first line of the frame buffer image 600 and the backlight configuration 606 is encoded on the second line of the frame buffer image 600. In some implementations, the image transport module 318 may encode the foveal coordinates 608 and/or backlight configuration 606 using a 2-bits per pixel sparse encoding technique. For example, bits "00" may be encoded as a black pixel, bits "01" may be encoded as a red pixel, bits "10" may be encoded as a green pixel, and bits "11" may be encoded as a white pixel. The sparse encoding may provide greater robustness against compression and/or other processing along the data path, and may thus allow the foveal coordinates 608 and/or backlight configuration 606 to survive display stream compression (DSC) and/or other compression algorithms or techniques.

In some implementations, the foveal coordinates 608 may identify at least one pixel location associated with the foveal region of the FFOV image 604. For example, in some aspects, the foveal coordinates 608 may identify the pixel in a particular corner, or center, of the foveal region. In some other aspects, the foveal coordinates 608 may identify a set of pixels defining a boundary of the foveal region. In some implementations, the backlight configuration 606 may specify the length or duration of a backlight burst (e.g., 12 bits) and/or the PWM current for controlling the backlight burst (e.g., 12 bits). For example, the length or PWM values can be adjusted to set the brightness or intensity of the backlight.

The display device 320 receives the display data 305 from the host device 310 and displays a corresponding image to the user. In some embodiments, the display device 320 may include a display driver 322 coupled to a display 324 and a backlight 326. In some embodiments, the display 324 may be a liquid-crystal display (LCD) panel formed from an array of pixel elements (e.g., liquid crystal cells) configured to allow varying amounts of light to pass from one surface of the display panel to another (e.g., depending on a voltage or electric field applied to each pixel element). The backlight 326 may comprise one or more light sources including, but not limited to, cold cathode fluorescent lamps (CCFLs), external electrode fluorescent lamps (EEFLs), hot-cathode fluorescent lamps (HCFLs), flat fluorescent lamps (FFLs), light-emitting diodes (LEDs), or any combination thereof. In some aspects, the backlight 326 may include an array of discrete light sources (such as LEDs) that can provide different levels of illumination to different regions of the display 324.

The display driver 322 may generate one or more pixel control signals 306, based on the received display data 305, to update the pixel elements of the display 324. The display driver 322 may also generate one or more backlight control signals 307, based on the received display data 305, to adjust a brightness of the backlight 326. For example, the display data 305 may correspond to a frame buffer image in which the FFOV image 302 is already merged with the foveal image 303 (such as the frame buffer image 500 of FIG. 5) or a frame buffer image in which the FFOV image 302 is encoded separately from the foveal image 303 (such as the frame buffer image 600 of FIG. 6). In some embodiments, the display driver 322 may determine how to process the received display data 305 based, at least in part, on the aspect ratio (or display format) of the frame buffer image.

For example, if the aspect ratio of the frame buffer image matches the aspect ratio of the display 324, the display driver 322 may determine that the FFOV image 302 and the foveal image 303 have already been merged into a combined image (e.g., as shown in FIG. 5). Accordingly, the display driver 322 may render the frame buffer image as-is on the display 324 (e.g., using the pixel control signals 306). The display driver 322 may also look for backlight configuration data encoded in a portion of the frame buffer image coinciding with a non-display region of the FFOV image 302 (such as the top-left corner of the frame buffer image). The display driver may then apply the appropriate amount of dimming to the backlight 326 (e.g., using the backlight control signals 307) based on backlight intensity information included in the backlight configuration data. In some embodiments, the display driver 322 may further perform adjustments to the pixel control signals 306 based on pixel adjustment values included in the backlight configuration data.

However, if the aspect ratio of the frame buffer image does not match the aspect ratio of the display 324, the display driver 322 may determine that the FFOV image 302 and the foveal image 303 are encoded separately (e.g., as shown in FIG. 6). Accordingly, the display driver 322 may parse the FFOV image 302 and the foveal image 303 from the frame buffer image based on their relative positions in the frame buffer image. The display driver 322 may then upscale the FFOV image 302 to the resolution at which it is to be rendered on the display 324. Since the foveal image 303 is received in the resolution at which it is to be rendered on the display 324, display driver 322 may merge the foveal image 303 with the FFOV image 302 as an overlay (e.g., using the pixel control signals 306). The display driver 322 may also look for backlight configuration data encoded in a portion of the frame buffer image coinciding with a non-display region of the FFOV image 302 (such as in the middle-left portion of the frame buffer image). The display driver may then apply the appropriate amount of dimming to the backlight 326 (e.g., using the backlight control signals 307) based on backlight intensity information included in the backlight configuration data. In some embodiments, the display driver 322 may further perform adjustments to the pixel control signals 306 based on pixel adjustment values included in the backlight configuration data.

Because the backlight configuration 304 is generated on the host device 310 and transmitted to the display device 320 concurrently with other image data (e.g., FFOV image 302 and foveal image 303), over the same channel (e.g., as display data 305), the backlight configuration 304 remains synchronized with the associated FFOV image 302 and foveal image 303 received by the display device 320. Thus, the display device 320 may apply the backlight configuration 304 when displaying the corresponding image from which it was derived. This may reduce the frequency and/or severity of artifacts in the images displayed on the display device 320. Further, by encoding the backlight configuration 304 in the frame buffer image, the host device 310 may reduce the bandwidth and/or frequency of communications with the display device 320 and ensure that the backlight configuration 304 is received, and thus processed, by the display device 320 concurrently with the associated image data (e.g., corresponding to the FFOV image 302 and foveal image 303).

It is noted that, in some implementations, the backlight 326 may include an array of discrete light sources (such as LEDs) that can provide different levels of illumination to different regions of the display 324. For example, each light source may be individually-controlled to provide a specific level of illumination to a particular subset of pixel elements. Accordingly, the backlight configuration 304 may include a backlight "image" that describes the level of illumination to be provided to each light source in the array. Aspects of the present disclosure recognize that compression of the backlight configuration 304 (e.g., via the image transport module 318) may cause artifacts in the backlight image. As a result, the backlight image received by the display device 320 may differ from the backlight image generated by the host device 310. Thus, in some embodiments, the backlight controller 316 may pre-distort the pixel adjustment values that are associated with the backlight image to ensure that the correct image brightness is reproduced by the display device 320 (e.g., to compensate for artifacts in the backlight image due to compression).

Figure 7:
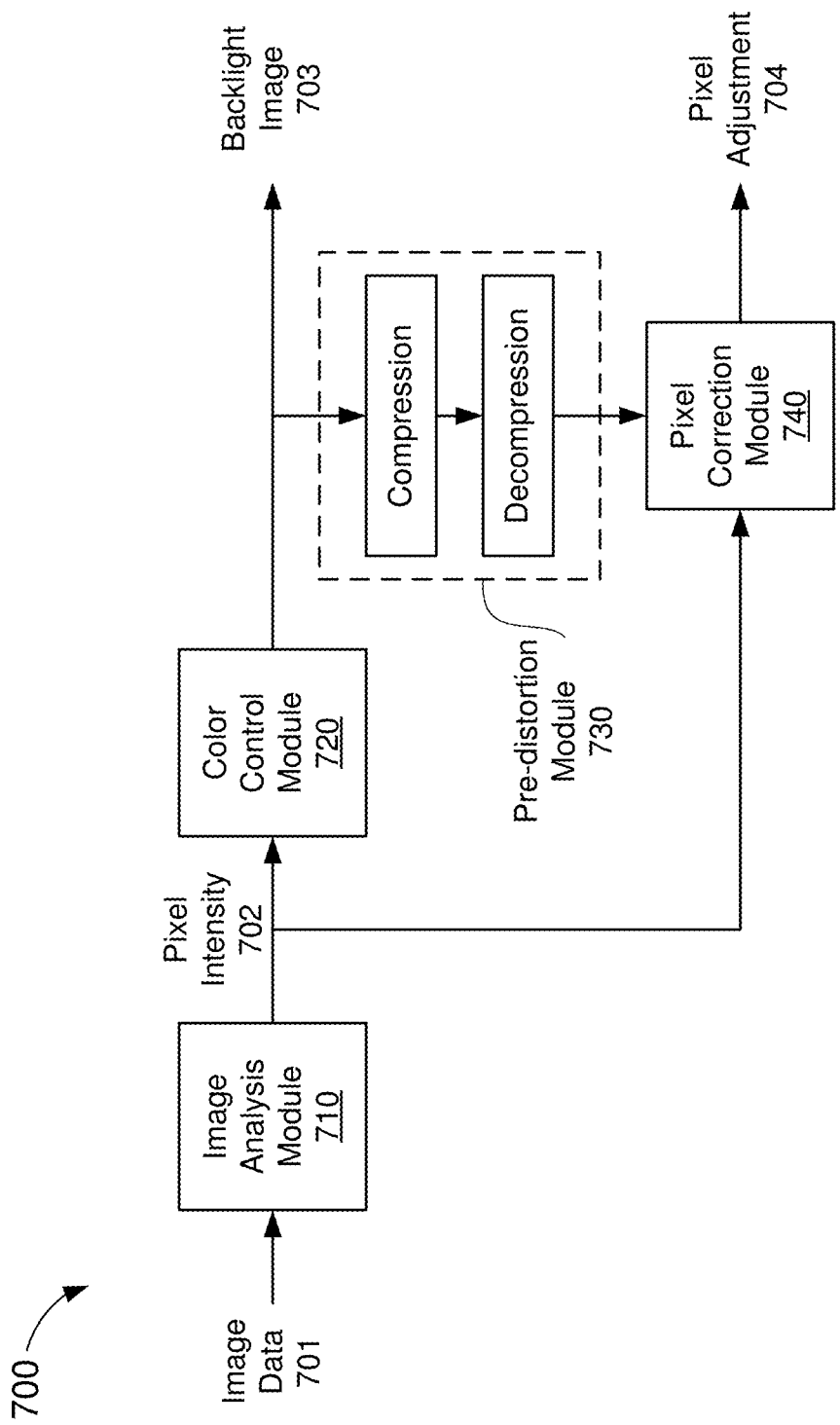
FIG. 7 shows a block diagram of an example backlight controller for a local dimming array, in accordance with some embodiments.

FIG. 7 shows a block diagram of an example backlight controller 700 for a local dimming array, in accordance with some embodiments. The backlight controller 700 may be an example embodiment of the backlight controller 316 of FIG. 3. For example, the backlight controller 700 may determine the intensity or amount of illumination for each discrete light source in the backlight 326 (e.g., local dimming array) based, at least in part, on pixel information associated with an image or frame to be rendered on the display 324. The backlight controller 700 may include an image analysis module 710, a color control module 720, a pre-distortion module 730, and a pixel correction module 740.

The image analysis module 710 may receive image data 701 associated with an image to be displayed by a corresponding display device (e.g., display 324), and may determine pixel intensity information 702 for the image based on the received image data 701. In some embodiments, the display 724 may be an LCD display panel comprising an array of pixel elements (e.g., liquid crystal cells). Each pixel element may further comprise a plurality of subpixels including, but not limited to, red (R), green (G), and blue (B) subpixels. The image data 701 may include R, G, and B values for the subpixels of the image to be displayed. More specifically, the R, G, and B values may indicate a level of brightness (or gray level) for each pixel. Thus, in some aspects, the image analysis module 710 may generate the pixel intensity information 702, indicating the brightness (or gray) level of each pixel, based on a weighted sum (or average) of the R, G, and B values from the received image data 701.

The color control module 720 may receive the pixel intensity information 702 from the image analysis module 710, and may generate a backlight image 703 based on the pixel intensity information 702. In some embodiments, the color control module 720 may perform a histogram-based analysis of the brightness level of each pixel (e.g., as derived from the pixel intensity information 702) to determine an appropriate backlight intensity for each discrete light source in the local dimming array. For example, the histogram may indicate the frequency of (e.g., number of pixels associated with) each brightness level in the image. The color control module 720 may analyze the pixel brightness distribution of the image to determine an overall brightness measure of each illuminable region of the image (e.g., each grouping of pixels coinciding with a discrete light source). The color control module 720 may then generate the backlight image 703 based on the various brightness measures of the image. For example, the backlight image 703 may indicate the lowest backlight intensity, for each discrete light source, that can achieve or maintain the brightness measure for the associated grouping of pixels.

As described above, dimming a particular light source beyond a certain threshold may cause one or more pixels of the display to become clipped, resulting in washout. In other words, the intensity of the light source becomes the limiting factor (for the pixel intensity) when the brightness of the pixel cannot be further increased by applying a higher (or lower) voltage to the liquid crystal cell. Thus, in some aspects, the color control module 720 may prevent washout by setting the brightness measure for an illuminable region of the image according to the brightest pixel intensity observed in the pixel brightness distribution associated with that region. For example, if the brightest pixel in a particular region is at 80% of a maximum brightness level, the overall brightness measure of the region may be characterized as 80%. Accordingly, the intensity of the light source coinciding with that region may be set at 80% of the maximum achievable brightness of the light source (e.g., as indicated in the backlight image 703).

It is noted, however, that some degree of washout may be virtually unnoticeable to the human eye. Thus, in some aspects, the color control module 720 may allow some of the pixels to be clipped in order to further reduce the intensity of the backlight. For example, the color control module 720 may calculate the overall brightness measure of each illuminable region of the image based on an average brightness (or weighted average) of each of the pixels in that region. For example, if the pixel brightness distribution suggests that the average pixel brightness for a particular region is at 60% of a maximum brightness level, the overall brightness measure for that region may be characterized as 60%. Accordingly, the intensity of the light source coinciding with that region may be set at 60% of the maximum achievable brightness of the light source (e.g., as indicated in the backlight image 703).

The pixel correction module 740 may receive the backlight image 703 from the color control module 720 and the pixel intensity information 702 from the image analysis module 710, and may determine one or more pixel adjustment values 704 associated with the current image or frame. In some embodiments, the pixel adjustment values 704 may be used to adjust the voltages controlling the pixel elements of the display in proportion to the amount of dimming applied to respective light sources in the backlight. As described above, the voltage applied to a pixel element determines the amount of light (e.g., from the light source) allowed through to the surface of the display by that particular pixel element. Reducing the intensity of the backlight naturally results in reduced pixel brightness. To compensate for the reduced brightness of the backlight, it may be desirable to increase (or decrease) the voltage of one or more of the pixels to allow a greater amount of light to pass through.

Thus, depending on the desired brightness of a particular pixel (e.g., as derived from the from the pixel intensity information 702), the pixel correction module 740 may selectively adjust the voltage that would otherwise be applied to that particular pixel, for example, to compensate for the brightness of the light source associated with the pixels to be displayed (e.g., as derived from the backlight image 703). For example, if the intensity of a particular light source is reduced by 10% (relative to its maximum brightness), the pixel correction module 740 may determine that the voltage applied to one or more associated pixel elements should be increased proportionately (e.g., to allow 10% more light through).

As described above, data compression may cause artifacts in the backlight image 703 (e.g., when transmitted between the host device 310 and the display device 320). As a result, the backlight image received by the display device 320 may differ from the backlight image generated by the host device 310. In other words, without compensating for such artifacts, the pixels rendered on the display 324 may not have the correct color and/or brightness when the backlight image 703 is combined with the pixel adjustment values 704. Thus, in some embodiments, the pre-distortion module 730 may pre-distort the backlight image 703 that is provided to the pixel correction module 740, for example, to compensate for artifacts in the backlight image 703 resulting from data compression.

More specifically, the pre-distortion module 730 may compress the backlight image 703 (e.g., using any compression algorithms or techniques implemented by the image transport module 318 and/or any other sources along the data path) and immediately decompress the backlight image 703 (e.g., using any decompression algorithms or techniques implemented by the display driver 322 and/or any other sources along the data path) to pre-load the backlight image 703 with the artifacts that would be perceived by the display device 320. Accordingly, the pixel correction module 740 may generate the pixel adjustment values 704 based on the pre-distorted backlight image 703. This may ensure that the pixel adjustment values 704 are synchronized or otherwise coincide with the backlight image 703 that will be received by the display device 320 (e.g., including any artifacts caused by compression/decompression).

Figure 8:
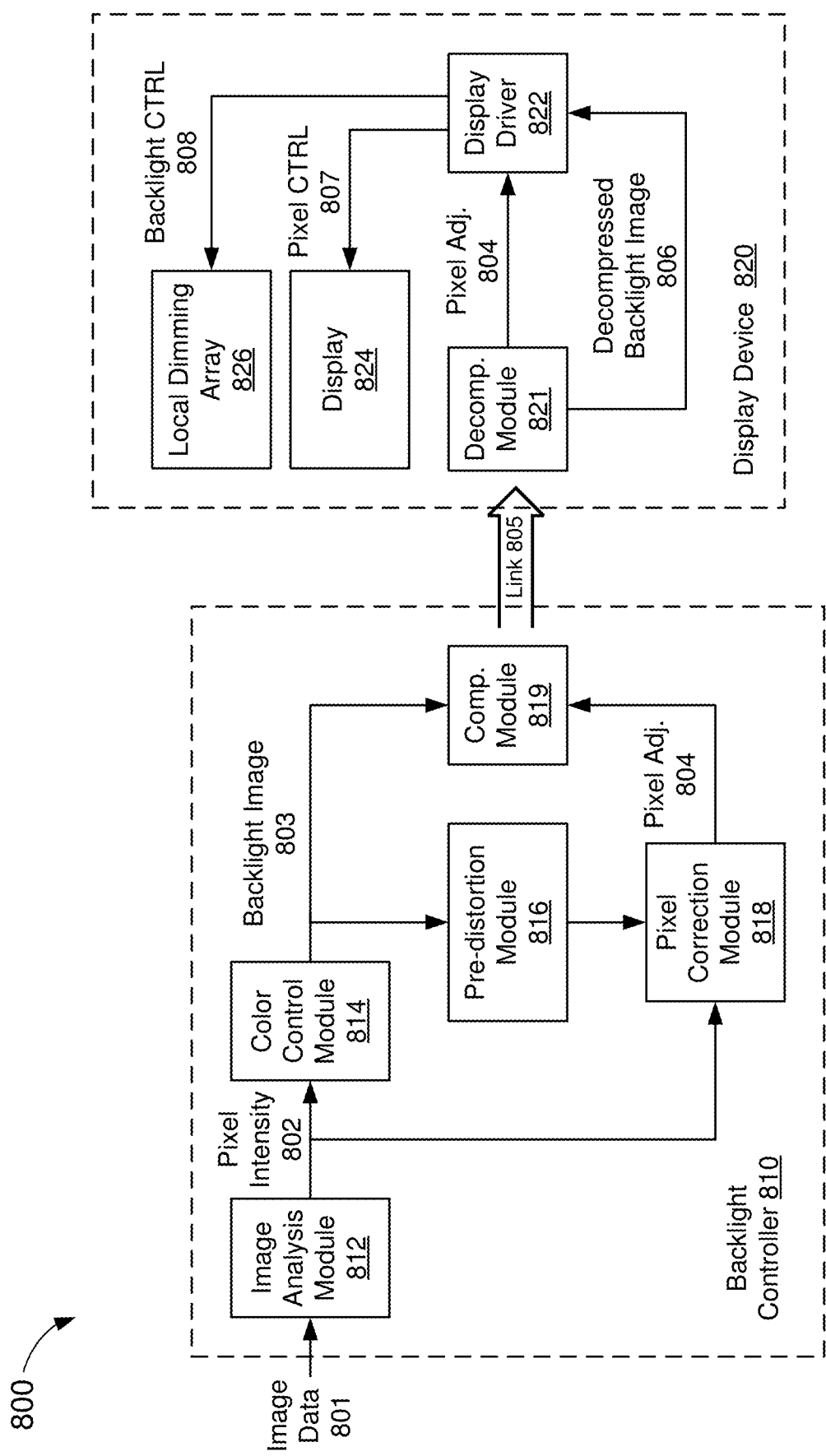
FIG. 8 shows a block diagram of an example display system with a local dimming array, in accordance with some embodiments.

FIG. 8 shows a block diagram of an example display system 800 with a local dimming array, in accordance with some embodiments. The display system includes a backlight controller 810 and a display device 820. The display system 800 may be an example embodiment of the display system 300 of FIG. 3. For example, the display device 820 may be any device configured to display an image, or sequence of images (e.g., video), to a user. In some embodiments, the display device 820 may be a head-mounted display (HMD) device. Further, the backlight controller 810 may reside on a host device (such as the host device 310 of FIG. 3) that is coupled to, or communicates with, the display device 820 via a communications link 805. As described above, the link 805 may be a wired and/or wireless medium that uses various communication technologies (such as buses and networks).

The display device 820 may be an example embodiment of the display device 320 of FIG. 3 or display device 120 of FIG. 1. In the example of FIG. 8, the display device 820 includes a display 824 and a local dimming array 826. The backlight controller 810 may be an example embodiment of the backlight controller 316 of FIG. 3 or backlight controller 700 of FIG. 7. For example, the backlight controller 810 may determine the intensity or amount of illumination for each discrete light source in the local dimming array 826 based, at least in part, on pixel information associated with an image or frame to be rendered on the display 824. The backlight controller 810 includes an image analysis module 812, a color control module 814, a pre-distortion module 816, a pixel correction module 818, and a data compression module 819.

The image analysis module 812 may receive image data 801 associated with an image to be displayed by the display device 820 (e.g., on the display 824), and may determine pixel intensity information 802 for the image based on the received image data 801. In some embodiments, the display 824 may be an LCD display panel comprising an array of pixel elements (e.g., liquid crystal cells). Each pixel element may further comprise a plurality of subpixels including, but not limited to, red (R), green (G), and blue (B) subpixels. The image data 801 may include R, G, and B values for the subpixels of the image to be displayed. More specifically, the R, G, and B values may indicate a level of brightness (or gray level) for each pixel. Thus, in some aspects, the image analysis module 812 may generate the pixel intensity information 802, indicating the brightness (or gray) level of each pixel, based on a weighted sum (or average) of the R, G, and B values from the received image data 801.

The color control module 814 may receive the pixel intensity information 802 from the image analysis module 812, and may generate a backlight image 803 based on the pixel intensity information 802. In some embodiments, the color control module 814 may perform a histogram-based analysis of the brightness level of each pixel (e.g., as derived from the pixel intensity information 802) to determine an appropriate backlight intensity for each discrete light source in the local dimming array 826. For example, the backlight image 803 may indicate the lowest backlight intensity, for each discrete light source, that can achieve or maintain the brightness measure for the associated grouping of pixels.

In some aspects, the color control module 814 may further prevent washout by setting the brightness measure for an illuminable region of the image according to the brightest pixel intensity observed in the pixel brightness distribution associated with that region. It is noted, however, that some degree of washout may be virtually unnoticeable to the human eye. Thus, in some aspects, the color control module 814 may allow some of the pixels to be clipped in order to further reduce the intensity of the backlight.

The pixel correction module 818 may receive the backlight image 803 from the color control module 814 and the pixel intensity information 802 from the image analysis module 812, and may determine one or more pixel adjustment values 804 associated with the current image or frame. In some embodiments, the pixel adjustment values 804 may be used to adjust the voltages controlling the pixel elements of the display 824 in proportion to the amount of dimming applied to respective light sources in the local dimming array 826. As described above, depending on the desired brightness of a particular pixel, the pixel correction module 818 may selectively adjust the voltage that would otherwise be applied to that particular pixel (e.g., to compensate for the brightness of the light source associated with the pixels to be displayed).

In some embodiments, the pre-distortion module 816 may pre-distort the backlight image 803 that is provided to the pixel correction module 818, for example, to compensate for artifacts in the backlight image 803 resulting from data compression. As described above, the pre-distortion module 816 may compress the backlight image 803 (e.g., using any compression algorithms or techniques implemented by the data compression module 819) and immediately decompress the backlight image 803 (e.g., using any decompression algorithms or techniques implemented by a decompression module 821 residing on the display device 820) to pre-load the backlight image 803 with the artifacts that would be perceived by the display device 820. Accordingly, the pixel correction module 818 may generate the pixel adjustment values 804 based on the pre-distorted backlight image 803. This may ensure that the pixel adjustment values 804 are synchronized or otherwise coincide with the backlight image 803 that will be received by the display device 820.

The data compression module 819 compresses the backlight image 803 and the pixel adjustment values 804 for transmission to the display device 820. For example, the data compression module 819 may use display stream compression (DSC) and/or other known compression algorithms or techniques to compress the backlight image 803 and the pixel adjustment value 804 for transmission over the link 805. In some embodiments, the compressed data may be encoded as pixel data (e.g., as described above with respect to FIGS. 5 and 6). Thus, the compressed data may correspond to a backlight configuration encoded in a corresponding image or frame to be displayed on the display device 820 (such as the backlight configuration 506 of FIG. 5 or the backlight configuration 606 of FIG. 6).

The display device 820 receives the backlight configuration data from the backlight controller 810, via the link 805, and uses the received data to update the display 824 and the local dimming array 826. More specifically, the decompression module 821 may receive the compressed data transmitted by the data compression module 819, and may decompress the received data to recover the pixel adjustment values 804 and a decompressed backlight image 806. For example, the decompression module 821 may use the same (or similar) compression algorithms or techniques implemented by the compression module 819 to extract the pixel adjustment values 804 and the backlight image 806 from the data received over the link 805.

As described above, data compression may cause artifacts in the backlight image 803 (e.g., when transmitted from the backlight controller 810 to the display device 820). As a result, the decompressed backlight image 806 may differ from the backlight image 803 generated by the backlight controller 810. However, by pre-distorting the backlight image 803 that is provided to the pixel correction module 818 (e.g., when generating the pixel adjustment values 804), the pixel adjustment values 804 extracted by the decompression module 821 may have the correct color and/or brightness when combined with the decompressed backlight image 806.

The decompression module 821 may then provide the pixel adjustment values 804 and the decompressed backlight image 806 to a display driver 822. The display driver 822 may generate one or more pixel control signals 807 (based at least in part on the pixel adjustment values 804) to update the pixel elements of the display 824, and may also generate one or more backlight control signals 808 (based at least in part on the decompressed backlight image 806) to adjust a brightness of one or more discrete light source in the local dimming array 826.

Figure 9A:
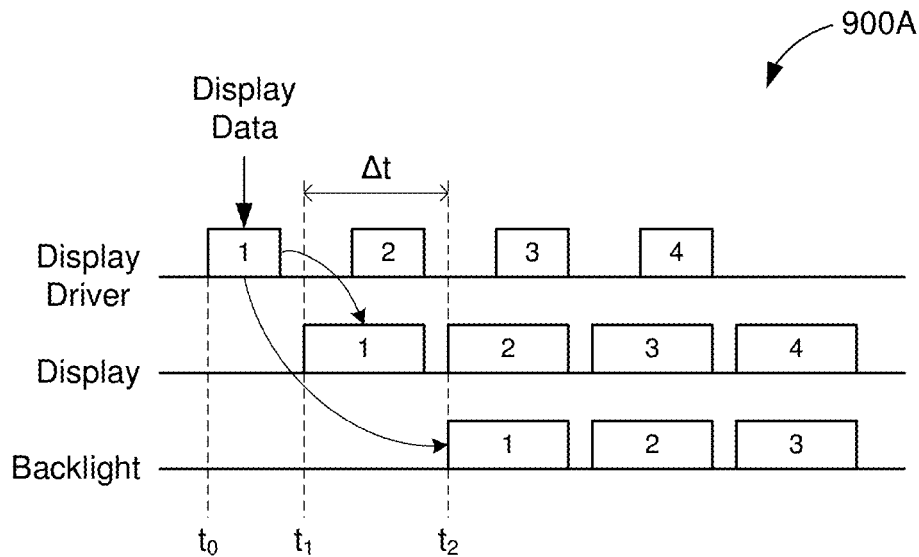
FIGS. 9A and 9B are timing diagrams illustrating example timing relationships between the display driver, display, and backlight of a display device.
Figure 9B:
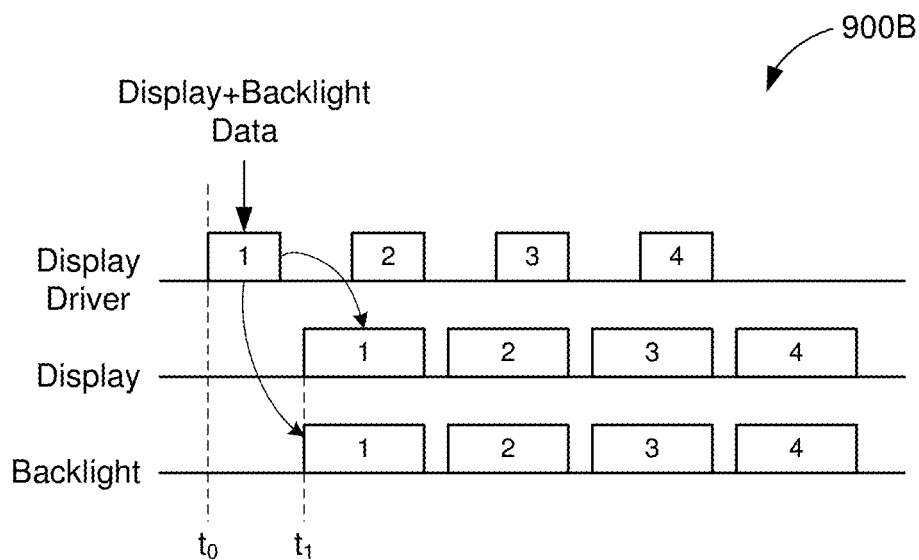

FIGS. 9A and 9B are timing diagrams 900A and 900B illustrating example timing relationships between the display driver, display, and backlight of a display device. Specifically, the timing diagram 900A of FIG. 9A shows an example interaction between a display driver, display, and backlight, where the backlight control is configured by the display driver. On the other hand, the timing diagram 900B of FIG. 9B shows an example interaction between a display driver, display, and backlight, where the backlight control is configured by a host device.

In the example of FIG. 9A, the display driver updates the display, at time $t_1$, and adjusts the backlight, at time $t_2$, based on a frame of display data received (e.g., from a host device) at time $t_0$. As described above, in conventional display systems, backlight control functionality is implemented by the display driver residing on a display device (such as an HMD device). Thus, the display driver may generate the backlight configuration (e.g., backlight intensity information, backlight image, and/or pixel values) while concurrently rendering each frame of display data received from the host. However, because the backlight configuration is determined based on a frame that is already being display, the backlight adjustment may lag the display update by at least one frame (e.g., $\Delta t$). As shown in FIG. 9A, the backlight adjustment associated with the first frame of display data is implemented when the display driver is already displaying the next frame in the sequence (e.g., at time $t_2$). This lag ($\Delta t$) between the display updates and backlight control may result in artifacts that are noticeable to a user of the display device.

In the example of FIG. 9B, the display driver updates the display and adjusts the backlight, at time $t_1$, based on a frame of display and backlight data received (e.g., from the host device) at time $t_0$. In the embodiments disclosed herein, the host device may generate the backlight configuration (e.g., backlight intensity information, backlight image, and/or pixel values) while concurrently processing image source data for display on the display device. Accordingly, the host device may send the backlight configuration, together with the display data, to the display driver residing on the display device. This allows the display driver to render each image on the display using the correct backlight intensity for that particular image. As shown in FIG. 9B, the display driver may update the display and adjust the backlight, concurrently (e.g., at time $t_1$), for each frame of data received from the host device. As a result, the lag ($\Delta t$) shown in FIG. 9A is effectively eliminated.

Figure 10:
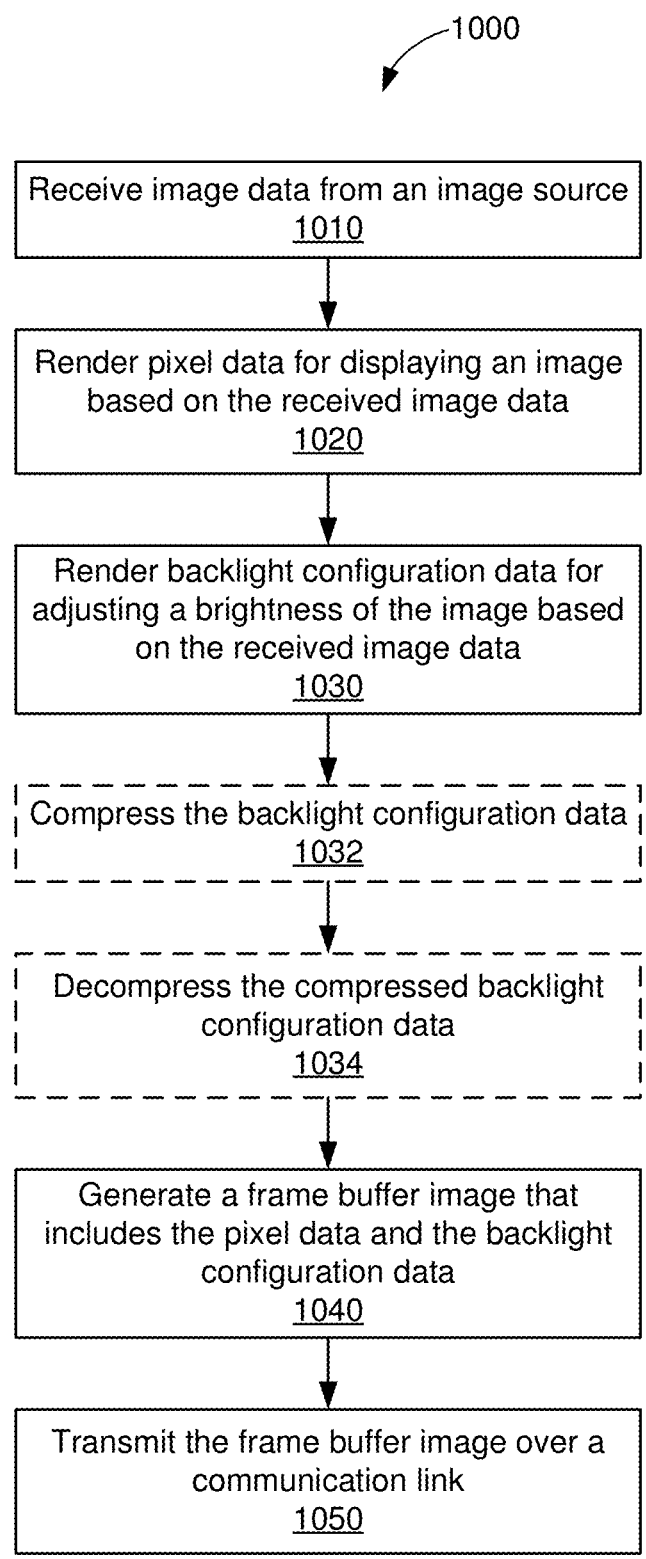
FIG. 10 is an illustrative flowchart depicting an example operation for generating a frame buffer image, including backlight configuration data, on a host device.

FIG. 10 is an illustrative flowchart depicting an example operation 1000 for generating a frame buffer image, including backlight configuration data, on a host device. With reference for example to FIGS. 1, 3, and 8, the example operation 1000 may be performed by any host device of the present disclosure (e.g., host device 110, host device 310, and/or backlight controller 810).

The host device first receives image data from an image source (1010). For example, the image data may describe an image to be displayed by a display device. The display device may include a display panel or surface comprising an array of pixel elements. Each pixel element may further comprise a plurality of subpixels including, but not limited to, red (R), green (G), and blue (B) subpixels. In some embodiments, the image data may include R, G, and B values for the subpixels of the image to be displayed.

The host device may render pixel data for displaying an image based on the received image data (1020). For example, the pixel data may indicate a voltage to be applied to each pixel element of the display device. More specifically, the voltage may control a level of brightness (or gray level) for the corresponding pixel element. In some embodiments, the host device may render pixel data corresponding to an FFOV image and a foveal image based in the received image data. For example, the FFOV image may correspond with a full-frame image to be displayed across most (if not all) of the display surface. On the other hand, the foveal image may span only the foveal region of the user's line of sight.

The host device may further render backlight configuration data for adjusting a brightness of the image based on the received image data (1030). For example, the backlight configuration data may indicate an intensity of the backlight to be used when displaying the image associated with the received image data. In some embodiments, the backlight configuration data may include backlight intensity information and/or pixel adjustment values. The backlight intensity information may indicate an amount of dimming to be applied to the backlight when displaying the image. The pixel adjustment values may indicate voltage adjustments to be applied to the pixel elements of the display device when displaying the image (e.g., at the selected backlight intensity).

In some embodiments, the host device may compress the backlight configuration data (1032) and subsequently decompress the compressed backlight configuration data (1034). For example, in some implementations, the backlight of the display device may comprise an array of discrete light sources (e.g., a local dimming array) that can provide different levels of illumination to different regions of the display. Thus, in some aspects, the backlight configuration data may correspond to a backlight image that describes the level of illumination to be provided by each light source in the array. It is noted, however, that data compression (e.g., used to encode and/or transmit data over a communication link) may introduce artifacts in the backlight image. Thus, in some embodiments, the host device may compress and immediately decompress the backlight image to pre-load the backlight image with the artifacts that would otherwise be perceived by the display device.

In some aspects, the host device may compress the backlight image using any compression techniques implemented by the host device to transmit the backlight configuration data to the display device. In some other aspects, the host device may decompress the backlight image using any decompression techniques implemented by the display device to recover the backlight configuration data transmitted by the host device. Accordingly, the host device may generate the pixel adjustment values based on the pre-distorted backlight image. This may ensure that the pixel adjustment values are synchronized or otherwise coincide with the backlight image that will be received by the display device (e.g., including any artifacts caused by compression and/or decompression).

The host device may further generate a frame buffer image that includes the pixel data and the backlight configuration data (1040). For example, the host device may combine the pixel data and the backlight configuration data into a single frame of display data to be transmitted to the display device. In some embodiments, the host device may encode the backlight configuration data as a portion of the pixel data (e.g., corresponding to a non-display region of the FFOV image). This may reduce the bandwidth and/or frequency of communications between the host device and display device. Encoding the backlight configuration data as pixel data further ensures that the backlight configuration data is received, and thus processed, by the display device concurrently with the associated image data (e.g., corresponding to the FFOV image and foveal image). In some aspects, the foveal image may be merged with the FFOV image in the frame buffer image (e.g., as described above with respect to FIG. 5). In some other aspects, the foveal image may be separate from the FFOV image in the frame buffer image (e.g., as described above with respect to FIG. 6).

The host device may then transmit the frame buffer image over a communication link (1050). More specifically, the host device may transmit the pixel data together with the backlight configuration data over the same channel (e.g., in the same frame buffer image). The communication link may be a wired or wireless communication medium. In some embodiments, the host device may encode and/or compress the frame buffer image for transmission over the communication link.

Figure 11:
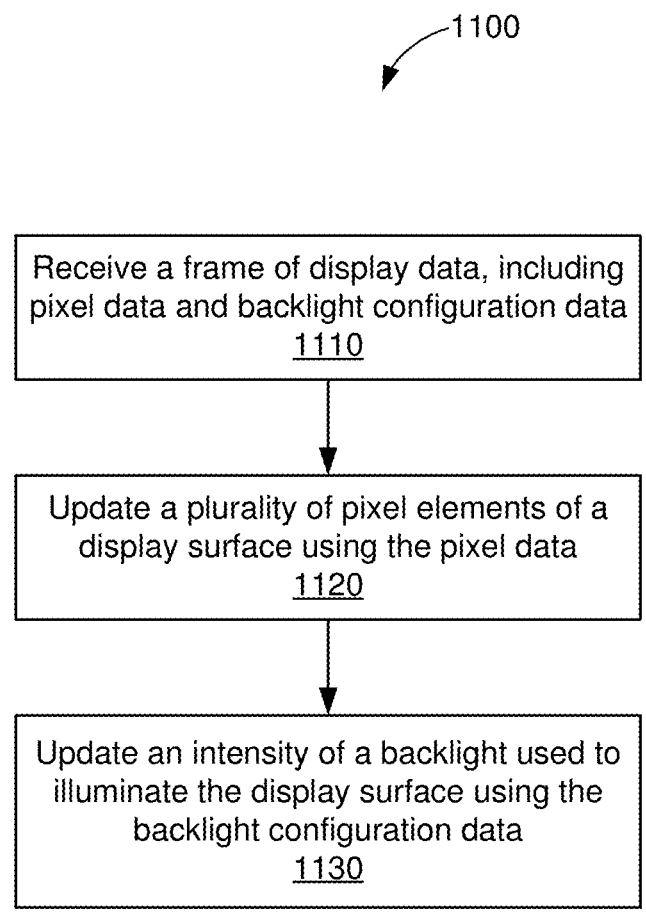
FIG. 11 is an illustrative flowchart depicting an example operation for updating a display surface and backlight, concurrently, using a frame buffer image received from a host device.

FIG. 11 is an illustrative flowchart depicting an example operation 1100 for updating a display surface and backlight, concurrently, using a frame buffer image received from a host device. With reference for example to FIGS. 1, 3, and 8, the example operation 1100 may be performed by any display device of the present disclosure (e.g., display device 120, 320, and/or 820).

The display device first receives a frame of display data, including pixel data and backlight configuration data (1110). The pixel data may indicate a level of brightness (or gray level) for each pixel element of the display device. The backlight configuration data may indicate an intensity of the backlight to be used when displaying the image associated with the received image data. In some embodiments, the backlight configuration data may include backlight intensity information and/or pixel adjustment values. The backlight intensity information may indicate an amount of dimming to be applied to the backlight when displaying the image. The pixel adjustment values may indicate voltage adjustments to be applied to the pixel elements of the display device when displaying the image (e.g., at the selected backlight intensity). In some aspects, the backlight configuration data may correspond to a backlight image describing a level of illumination to be provided by each light source in an array of discrete light sources (e.g., local dimming array).

The display device may update a plurality of pixel elements of a display surface using the pixel data (1120). For example, the display device may apply a respective voltage to each of the pixel elements to set the brightness for the corresponding pixel element to the desired level. In some embodiments, the frame of display data may correspond to a frame buffer image comprising an FFOV image and a foveal image. In some aspects, the display device may render the frame buffer image as-is on the display surface (e.g., if the aspect ratio of the frame buffer image matches an aspect ratio of the display surface, such as shown in FIG. 5). In some other aspects, the display device may upscale the FFOV image to the resolution at which it is to be rendered on the display surface (e.g., if the aspect ratio of the frame buffer image is different than an aspect ratio of the display device, such as shown in FIG. 6). The display device may then merge the foveal image with the FOV image as on overlay.

The display device may also update an intensity of a backlight used to illuminate the display surface using the backlight configuration data (1130). For example, the display device may generate one or more backlight control signals based on the backlight configuration data to adjust a brightness of the backlight. In some aspects, the backlight control signals may correspond to pulse-width modulated (PWM) signals that control a length or duration of a backlight burst. More specifically, because the backlight configuration information is determined by the host device (instead of the display device), the display device may update the backlight and display surface concurrently for the received frame of display data (e.g., using the included pixel data and backlight configuration data).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method performed by a display device, comprising:
receiving display data representing a frame buffer image that includes a first image and a second image to be at least partially overlaid upon the first image, the display data including pixel data for displaying the frame buffer image on a display surface of the display device and backlight configuration data for adjusting a backlight of the display device used to illuminate the display surface when displaying the frame buffer image, wherein the backlight configuration data is encoded as a portion of the pixel data;
identifying the portion of the pixel data corresponding to the backlight configuration data based at least in part on an aspect ratio of the frame buffer image;
updating a plurality of pixel elements of the display surface using the pixel data; and
updating an intensity of the backlight using the backlight configuration data, wherein the updates to the backlight and the display surface are performed concurrently for the received display data.

2. The method of claim 1, wherein the portion of the pixel data corresponds to a non-display region of the frame buffer image.

3. The method of claim 1, wherein the backlight configuration data is encoded in accordance with a 2-bits per pixel sparse encoding technique, wherein each pattern of bits is represented by a different pixel color.

4. The method of claim 1, wherein the first image represents a full field-of-view (FFOV) image and the second image represents a foveal image, the identifying comprising:
determining a position of the FFOV image in relation to the foveal image based on the aspect ratio of the frame buffer image; and
identifying the portion of the pixel data corresponding to the backlight configuration data based on the position of the FFOV image.

5. The method of claim 4, wherein the backlight configuration data is encoded in a corner of the FFOV image.

6. The method of claim 4, wherein the foveal image is merged with the FFOV image when the aspect ratio of the frame buffer image matches an aspect ratio of the display surface.

7. The method of claim 4, wherein the foveal image is separate from the FFOV image when the aspect ratio of the frame buffer image is different than an aspect ratio of the display surface.

8. A display device comprising:
a display surface including a plurality of pixel elements;
a backlight configured to illuminate the display surface; and
a display driver configured to:
receive display data representing a frame buffer image that includes a first image and a second image to be at least partially overlaid upon the first image, the display data including pixel data for displaying the frame buffer image on the display surface and backlight configuration data for adjusting the backlight when displaying the frame buffer image, wherein the backlight configuration data is encoded as a portion of the pixel data;

identify a portion of the pixel data corresponding to the backlight configuration data based at least in part on an aspect ratio of the frame buffer image;

update the plurality of pixel elements using the pixel data; and update an intensity of the backlight using the backlight configuration data, wherein the updates to the backlight and the plurality of pixel elements are performed concurrently for the received display data.

9. The display device of claim 8, wherein the backlight configuration data is encoded in accordance with a 2-bits per pixel sparse encoding technique wherein each pattern of bits is represented by a different pixel color.

10. The display device of claim 8, wherein the first image represents a full field-of-view (FFOV) image and the second image represents a foveal image, the identifying comprising:

determining a position of the FFOV image in relation to the foveal image based on the aspect ratio of the frame buffer image; and identifying the portion of the pixel data corresponding to the backlight configuration data based on the position of the FFOV image, wherein the backlight configuration data is encoded in a corner of the FFOV image.

11. A system comprising:

a host device to receive image data from an image source, the host device further configured to:

render pixel data for displaying an image based on the received image data;

render backlight configuration data for adjusting a brightness of the image based on the received image data, wherein the backlight configuration data is encoded as a portion of the pixel data;

generate a frame buffer image that includes the pixel data and the backlight configuration data, the frame buffer image including a first image and a second image to be at least partially overlaid upon the first image; and transmit the frame buffer image over a communication link; and a display device including a display surface and a backlight, the display device configured to:

receive the frame buffer image via the communication link;

identify a portion of the pixel data corresponding to the backlight configuration data based at least in part on an aspect ratio of the frame buffer image;

update a plurality of pixel elements of the display surface using the pixel data in the received frame buffer image; and update an intensity of the backlight using the backlight configuration data in the received frame buffer image.

12. The system of claim 11, wherein the backlight comprises an array of discrete light sources, and wherein the host device is further configured to:

generate a backlight image indicating a respective intensity of each of the discrete light sources;

compress the backlight image using a compression technique;

decompress the backlight image using a decompression technique; and generate one or more pixel adjustment values based at least in part on the decompressed backlight image, wherein the backlight configuration data includes the decompressed backlight image and the one or more pixel adjustment values.

13. The system of claim 12, wherein the display device is configured to update the plurality of pixel elements by:

adjusting a voltage applied to one or more of the pixel elements based at least in part on the one or more pixel adjustment values.

14. The system of claim 12, wherein the host device is configured to transmit the frame buffer image by:

compressing the frame buffer image using the compression technique; and transmitting the compressed frame buffer image over the communication link.

15. The system of claim 14, wherein the display device is configured to receive the frame buffer image by:

receiving the compressed frame buffer image via the communication link; and decompressing the received frame buffer image using the decompression technique.

* * * * *